(12) United States Patent
Lin

(10) Patent No.: US 7,511,585 B2
(45) Date of Patent: Mar. 31, 2009

(54) AUTOMATIC PAGE DETECTOR

(75) Inventor: Shyuh Der Lin, Jhubei (TW)

(73) Assignee: Holylite Microelectronics Corporation, Hsinchu (TW)

(*) Notice: Subject to any disclaimer, the term of this patent is extended or adjusted under 35 U.S.C. 154(b) by 56 days.

(21) Appl. No.: 11/779,823

(22) Filed: Jul. 18, 2007

(65) Prior Publication Data

US 2009/0021318 A1    Jan. 22, 2009

(51) Int. Cl.
*G01N 27/00* (2006.01)
*H03B 5/08* (2006.01)
*H03B 5/12* (2006.01)
*H03B 5/18* (2006.01)

(52) U.S. Cl. .................... 331/65; 331/46; 331/167; 324/236; 324/655; 324/656

(58) Field of Classification Search ............... 331/46, 331/65, 74–76, 117 R, 117 FE, 117 D, 167, 331/168; 324/236, 654, 655, 656
See application file for complete search history.

(56) References Cited

U.S. PATENT DOCUMENTS 5,791,648 A * 8/1998 Hohl ..................... 273/238

* cited by examiner

*Primary Examiner*—David Mis
(74) *Attorney, Agent, or Firm*—Perkins Coie LLP

(57) ABSTRACT

The present invention discloses an automatic page detector, to determine which page of a book is open. The automatic page detector uses a sensor plate and an inductor as a sensor. In the invention, there is a sensor plate at each page of the book and the locations of the sensor plates for different pages are different. There is an array of inductors just beneath the sensor plates when the book is closed. The inductors are connected to the feedback loop of a LC oscillator through analog switches. The proximity of a sensor plate to an inductor will change the frequency of the LC oscillator. Scanning the analog switches by a microprocessor and detecting the variation of frequency of the LC oscillator during each scanning time period, the status of each sensor plate will be detected and we can determine which page of a book is opened.

20 Claims, 6 Drawing Sheets

AUTOMATIC PAGE DETECTOR

BACKGROUND OF THE INVENTION

1. Field of the Invention

The present invention relates to an automatic page detector. In particular, the present invention relates to an automatic page detector by using a sensor plate at each page of the book, an array of inductors just beneath the sensor plate and feedback loop of a LC oscillator to determine which page of a book is open.

2. Description of the Related Art

Automatic page detector is often used in an electronic reading book. Electronic book is a book containing a speech synthesizer which can play the contents of the book from a speaker. The "STORY READER" produced by Publication International Ltd, is a prior art of an electronic book with the function of an automatic page detector. This prior art uses a lot of magnets and reed switches as the sensors of the automatic page detector. When a magnet is in proximity of a reed switch, the two terminals of the reed switch will be closed. By detecting the state of each reed switch in an electronic book, we can determine which page of the book is opened. The disadvantage of this technology is the high cost of the reed switch. Besides, the thickness of the magnet is too thick and inconvenient to embed in the paper of an electronic book. The other prior art of an electronic book with automatic page detecting function is "Power Touch" produced by Mattel Canada Inc. In this product photo detection technology is used. A sensor consists of an infrared photo diode and transistor pair. A reflecting material is coated on some location of a page of the electronic book. The reflecting material can reflects the infrared light from the photo diode to the photo transistor. Input the status of each photo transistor to a microprocessor, which page of a book is open can be determined. Because of using photo diode and photo transistor, this technology is also not cost effective. Besides, the light from the environment can affect the photo transistor and make the wrong detection. One more prior art is the technology invented by the inventor (application Ser. No. 11/365,469). The technology uses a magnet and an inductor as sensor. Also, the thickness of the magnet is too thick and inconvenient to embed in the paper of an electronic book. Besides, when uses a magnet and an inductor as a sensor, the interaction between the magnet and inductor will causes magnetic hysteresis effect in the inductor. A close proximity of a magnet to an inductor will cause variation of the inductance of the inductor. The inductance of the inductor will not return to its original value even if the magnet leaves far apart from the inductor. And the frequency of the oscillator will depend not only on the distance between the magnet and the inductor but also on the history of the interaction between magnet and inductor, and makes it more difficult to determine the proximity of a magnet to an inductor.

OBJECTS OF THE INVENTION

It is therefore an object of the invention to provide an automatic page detector which is cost effective.

It is another object of the invention to provide an automatic page detector which will not be affected by the light from the environment and is more reliable.

It is another object of the invention to provide an automatic page detector where the sensor in the paper of the electronic book can be installed easily.

DISCLOSURE OF THE INVENTION

The technology of the present invention uses low cost sensor plates and inductors as the sensors. An inductor is placed at the feedback of a LC oscillator. Input capacitor is placed at the input of the oscillator and output capacitor is placed at the output of the oscillator. The inductance of the inductors and the capacitance of the capacitors determine the frequency of the oscillator.

The proximity of a sensor plate to the inductor of oscillator will change the inductance of that inductor and change the frequency of the oscillator. By detecting the variation of the frequency of the oscillator, the proximity of a sensor plate to an inductor will be detected.

The sensor plate can be a diamagnetic material such as copper, aluminum, lead, silver, and carbon. Also the sensor plate can be a ferromagnetic material such as iron and ferrite. The sensor plate can be replaced by a powder which is made of diamagnetic or ferromagnetic material and printed on the paper of an electronic book.

In order to design an electronic book with automatic page detector, a sensor plate must be embedded at each page of the book with different location for each page. There is an array of inductors inside the holder of the book. And there is a sensor plate on the top of each inductor when the book is closed. When the book is open, some of the sensor plates will leave from the corresponding inductors. Thus the distance between sensor plate and inductor will change. Corresponding to the array of the sensor plates, there is an array of oscillators. Each inductor is connected to the feedback loop of the oscillator. Each output of the oscillator is connected to an input of a microprocessor.

Connecting the outputs of oscillators to inputs of a microprocessor, the variation of the frequency of each oscillator will be processed by the microprocessor. After the process by the microprocessor, the status of each sensor plate can be determined. From the status of the sensor plates we can determine which page of the book is opened.

In order to process the variation of the frequency, a counter is used in a microprocessor to count the input frequency from the LC oscillator. The microprocessor scans each output of the oscillator for a fixed time period. The counting result is stored in a register in the microprocessor as NX. The counting number NX is compared with a reference count NR. The reference count NR can be a pre-stored number in the microprocessor or a number input from external of microprocessor. The reference count can also be a counter number NX counted by the microprocessor at the initial time of power on of the system. The selection of the reference count depends on the application of the system. The reference count for different oscillators can be different. By comparing NX with NR corresponding to every oscillator, which page of a book is opened can be determined. In the selection of the sensor plates, avoid choosing the material which will cause hysteresis effect of magnetic field in the inductor.

BRIEF DESCRIPTION OF THE DRAWINGS

The foregoing and other advantages of the invention will be more fully understood with reference to the description of the best embodiment and the drawing wherein.

DESCRIPTION OF THE PREFERRED EMBODIMENTS

Figure 1:
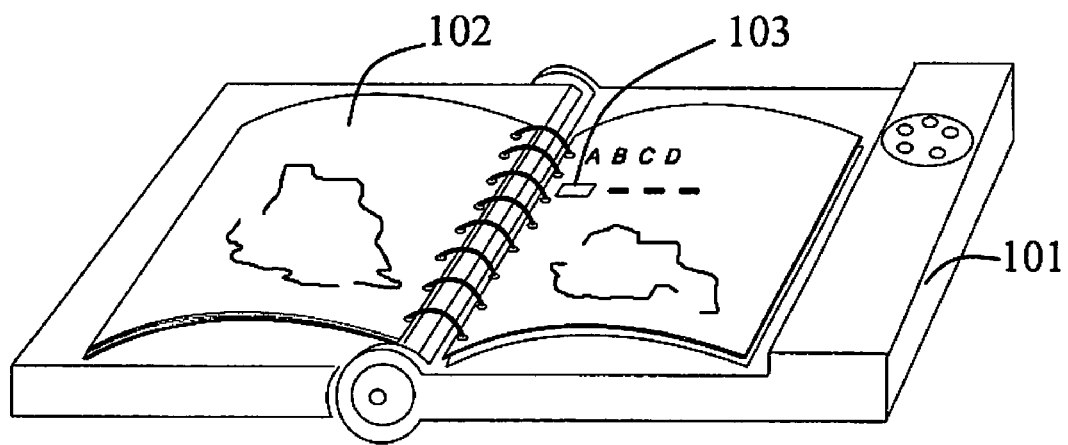
FIG. 1 is a schematic representation of an electronic book and book holder with a sensor plate in each page of the book in according to one embodiment of the present invention.

The foregoing and other advantages of the invention will be more fully understood with reference to the description of the best embodiment and the drawing as the following description.

An electronic book is a fancy toy for children to listen the content of a story in each page of the book. When the page of an electronic book is changed, the voice from the speaker of the book must be changed at the same time. The technology of automatic page detector is used in an electronic book to detect the change of the page number and to inform the speech synthesizer IC of the electronic book. The speech synthesizer IC will output the content corresponding to that page from the speaker.

One embodiment of an automatic page detector of the present invention consists of at least an array of sensor plates, an array of inductors, two oscillators and a microprocessor.

Both diamagnetic material and ferromagnetic material can be used as the sensor plate. Different material only causes different degree and different direction of frequency variation. The following circuits will be described by diamagnetic sensor plate. The same circuits can be also applied to the ferromagnetic sensor plate.

FIG. 1 is one embodiment of an electronic book. The electronic book consists of two parts. The first part is a book holder 101 with an array of inductors, electronic parts and PC board. The second part is a book 102 with a sensor plate 103 in each page of the book.

Figure 2:
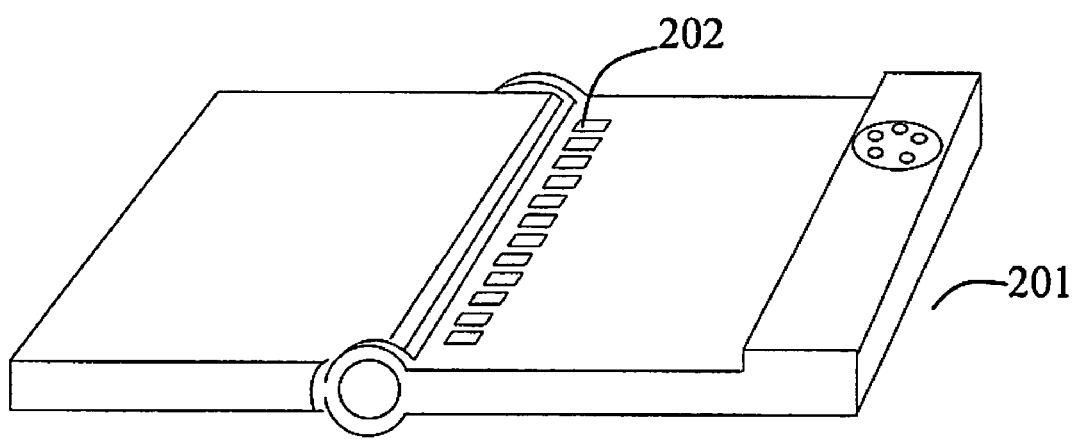
FIG. 2 is a schematic representation of a book holder with an array of inductors inside the book holder in according to one embodiment of the present invention.

FIG. 2 is one embodiment of the book holder. When the book is closed and placed on the book holder 201, each sensor plate of the book is just on the top of one inductor 202.

The technology of the invention uses a sensor plate as a sensor to change the frequency of a LC oscillator of the automatic page detector.

Figure 3:
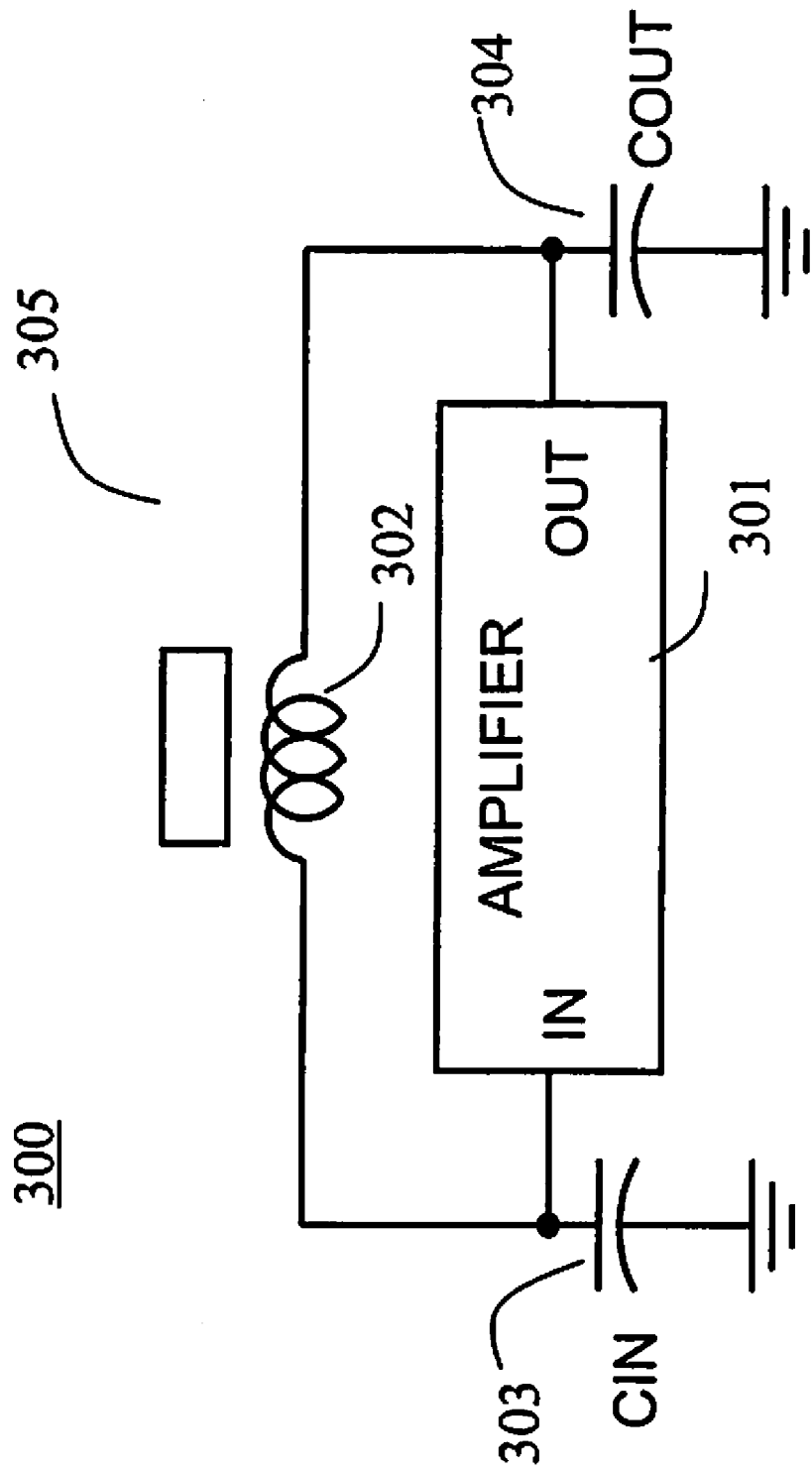
FIG. 3 is a LC oscillator in according to one embodiment of the present invention, which includes an amplifier, an input capacitor, an output capacitor and an inductor, and a sensor plate is in vicinity of the inductor.

FIG. 3 is one embodiment of the LC oscillator 300. The oscillator 300 consists of an amplifier 301, an inductor 302, an input capacitor 303 and an output capacitor 304. In FIG. 3, a sensor plate 305 is in vicinity of the inductor 302. The distance between the sensor plate 305 and the inductor 302 will affect the inductance of the inductor 302. And the frequency of the oscillator 300 will be affected by the distance between the sensor plate 305 and inductor 302.

Figure 4:
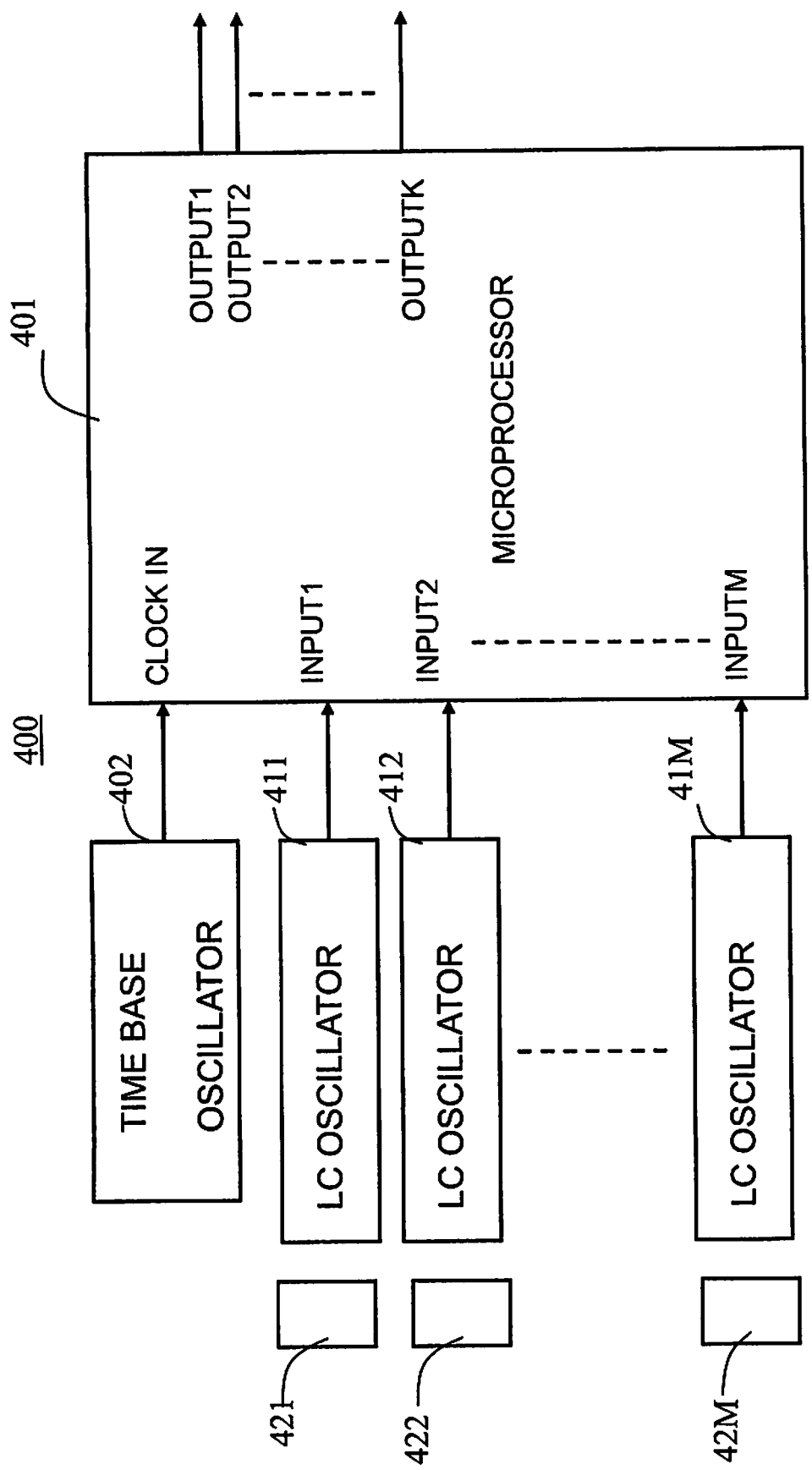
FIG. 4 is an automatic page detector in according to one embodiment of the present invention. The circuit consists of an array of LC oscillators, an array of sensor plates, a time base oscillator and a microprocessor.

In order to distinguish M different pages, M oscillators can be used in a system. FIG. 4 is an automatic page detector with M oscillators. In FIG. 4, the automatic page detector 400 consists of a time base oscillator 402, M oscillators 411 to 41M, M sensor plates 421 to 42M and a microprocessor 401. The time base oscillator 402 is an oscillator which provides the system clock to microprocessor 401. LC oscillators 411 to 41M are oscillators which function as sensors of the automatic page detector 400. Each of the sensor plates 421 to 42M is used to interact with one of the LC oscillators 411 to 41M. There is an inductor in each LC oscillator. The frequency of an oscillator will change if the distance between the sensor plate and inductor changes.

Connecting the outputs of the LC oscillators 411 to 41M to the inputs of the microprocessor 401, the variation of the frequency will be calculated and processed by the microprocessor 401. After processed by the microprocessor 401, the status of each sensor plate can be determined. From the status of the sensor plates we can determine which page of the book is opened.

In order to process the variation of the frequency, a counter is used in the microprocessor 401 to count the input frequency from each LC oscillator.

For each LC oscillator, the counted number NX is stored in a register and to be compared with a reference count NR. The reference count NR can be a pre-stored number in the microprocessor or a number input from external of microprocessor. The reference count can also be a counter number NX counted by the microprocessor at the initial time of power on of the system. The selection of the reference count depends on the application of the system. The reference count for different inductors can be different. When a page of a book is opened, the sensor plate in that page leaves the corresponding inductor and the frequency of the oscillator will decrease. Decreasing of the frequency means the decreasing of NX. By comparing NX with NR corresponding to every inductor, which page of a book is opened can be determined.

Further in order to reduce the cost of automatic page detector of the invention multiplexing technology can be used to reduce the number of LC oscillators.

Figure 5:
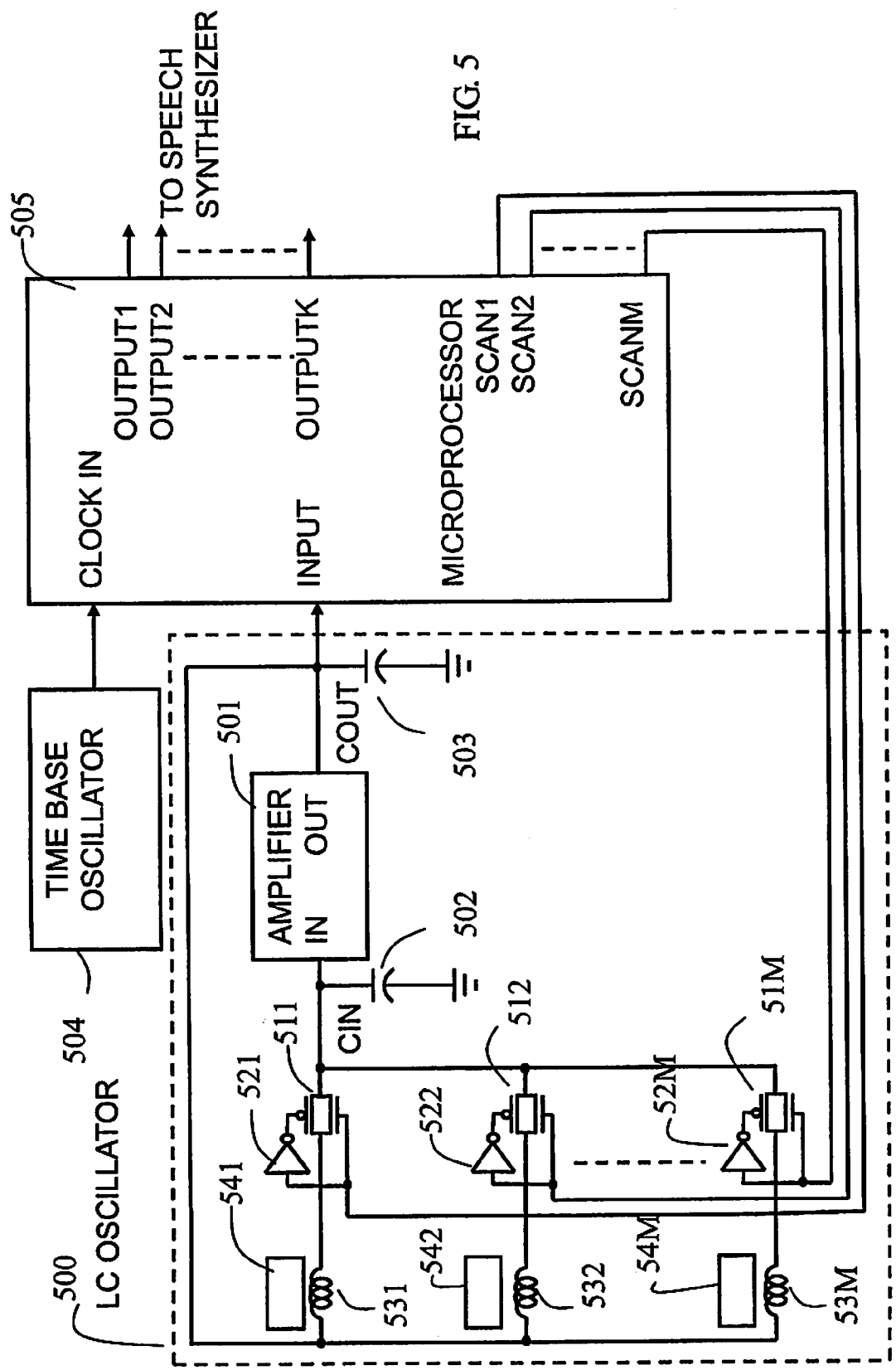
FIG. 5 is an automatic page detector in according to one embodiment of the present invention. The multiplexing analog switches at the input of amplifier reduce the number of oscillator.

FIG. 5 is another automatic page detector of the invention which can detect M different pages. The circuit consists of a LC oscillator 500 (the circuit inside the dotted line), an array of sensor plates 541 to 54M, time base oscillator 504 and a microprocessor 505. In FIG. 5, a LC oscillator circuit 500 is used in the automatic page detector. Capacitor 502 is the input capacitor of the amplifier 501 and capacitor 503 is the output capacitor of the amplifier 501. The inductors 531 to 53M are connected from the output of the amplifier 501 to the input through an array of analog switches 511 to 51M. The analog switches 511 to 51M are scanned sequentially by microprocessor 505. One and only one inductor is selected at one time. The frequency of the oscillator 500 is determined by input capacitor 502, output capacitor 503 and inductor selected. Connecting output of the LC oscillator 500 to the input of microprocessor 505, the frequency corresponding to each inductor can be detected by the microprocessor. The frequency of the oscillator 500 for each inductor can be determined by counting the clock number from the oscillator for a fixed time period and store the counting number NX in a register in the microprocessor 505.

For each inductor in the LC oscillator, the counter number NX is compared with a reference count NR. The reference count NR can be a pre-stored number in the microprocessor or a number inputted from external of microprocessor. The reference count can also be a counter number NX counted by the microprocessor at the initial time of power on of the system. The selection of the reference count depends on the application of the system. The reference count for different inductors can be different. When a page of a book is opened, the sensor plate in that page leaves the corresponding inductor and the frequency of the oscillator will decrease. Decreasing of the frequency means the decreasing of NX. By comparing NX with NR corresponding to every inductor, which page of a book is opened can be determined.

The above analog switches linking the inductors are connected at the input of the oscillator. The location of the analog switches can be changed to the output of the oscillator.

Figure 6:
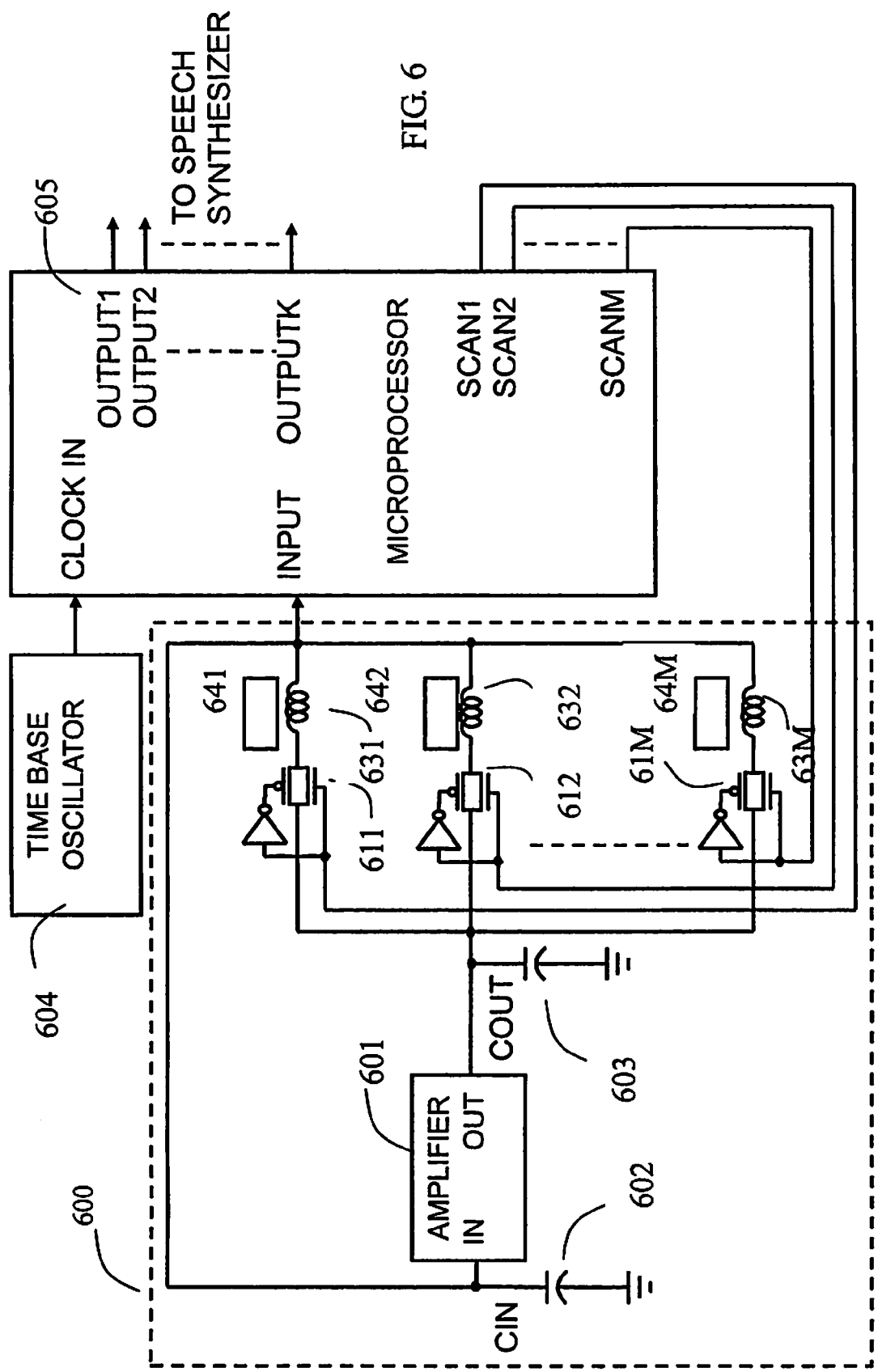
FIG. 6 is an automatic page detector in according to one embodiment of the present invention. The multiplexing analog switches at the output of amplifier reduce the number of oscillator.

FIG. 6 is an automatic page detector which can detect M different pages. The circuit consists of a LC oscillator 600 (the circuit inside the dotted line), an array of sensor plates 641 to 64M, time base oscillator 604 and a microprocessor 605. In FIG. 6, a LC oscillator circuit 600 is used in the automatic page detector. Capacitor 602 is the input capacitor of the amplifier 601 and capacitor 603 is the output capacitor of the amplifier 601. The inductors 631 to 63M are connected from the input of the amplifier 601 to the output through an array of analog switches 611 to 61M. The analog switches 611 to 61M are scanned sequentially by microprocessor 605. Only one inductor is selected at one time. The frequency of the oscillator 600 is determined by input capacitor 602, output capacitor 603 and inductor selected. Connecting input of the LC oscillator 600 to the input of microprocessor 605, the frequency corresponding to each inductor can be detected by the microprocessor. The frequency of the oscillator 600 for each inductor can be determined by counting the clock number from the oscillator for a fixed time period and store the counted number NX in a register in the microprocessor 605.

For each inductor in the LC oscillator, the counter number NX is compared with a reference count NR. The reference count NR can be a pre-stored number in the microprocessor or a number input from external of microprocessor. Also, the reference count can be a counter number NX counted by the microprocessor at the initial time of power on of the system. The selection of the reference count depends on the application of the system. The reference counts for different inductors can be different. When a page of a book is opened, the sensor plate in that page leaves the corresponding inductor and the frequency of the oscillator will decrease. The decreasing of frequency means the decreasing of NX. By comparing NX with NR corresponding to every inductor, which page of a book is opened can be determined.

If there are many pages in an electronic book, a lot of I/O pins must be used in a microprocessor to connect the inductors to the LC oscillator.

Figure 7:
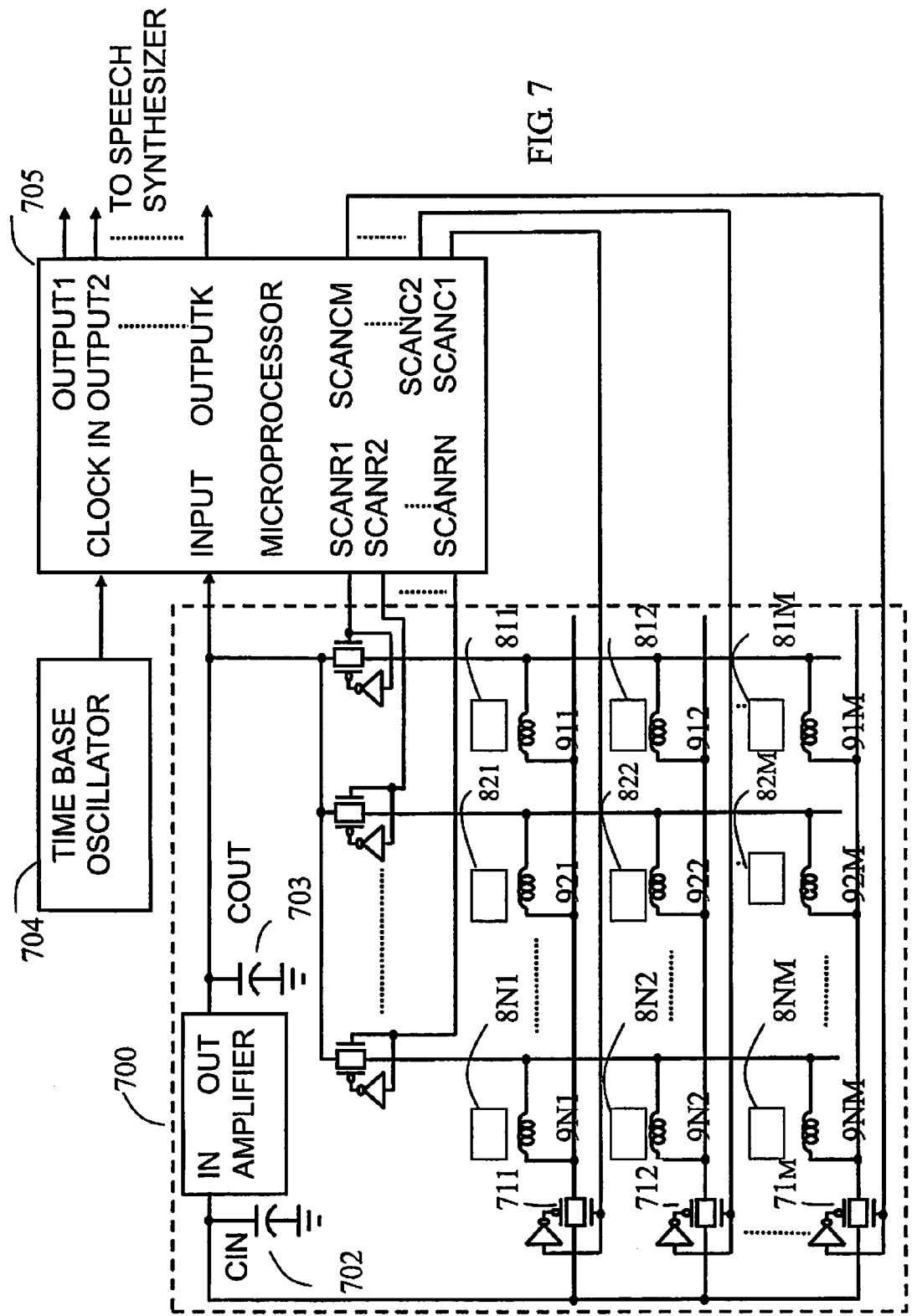
FIG. 7 is an automatic page detector in according to one embodiment of the present invention. The multiplexing analog switches at the input and output of amplifier reduce the number of oscillator and output pins of microprocessor.

The circuit in FIG. 7 can be used to reduce the I/O pins of microprocessor. In FIG. 7 an M×N matrix of inductors is used. In the LC oscillator, there are an array of M analog switches at the input of the oscillator and an array of N analog switches at the output of oscillator. The matrix consists of M×N inductors. Each inductor is connected to the input and output of the oscillator through one of the input analog switches and one of the output analog switches respectively. The input analog switches and output analog switches are scanned progressively by the microprocessor. Only one inductor is connected to the feedback loop of the amplifier at one time.

The frequency of the LC oscillator 700 is determined by input capacitor 702, output capacitor 703 and inductor selected by the analog switch. Connecting output of the LC oscillator 700 to the microprocessor 705, the frequency corresponding to each inductor can be detected by the microprocessor. The frequency of the oscillator 700 for each inductor can be determined by counting the clock number from the oscillator for a fixed time period and store the counted number NX in a register in the microprocessor 705.

For each inductor in the LC oscillator, the counted number NX is compared with a reference count NR. The reference count NR can be a pre-stored number in the microprocessor or a number input from external of microprocessor. Also, the reference count can be a counter number NX counted by the microprocessor at the initial time of power on of the system. The selection of the reference count depends on the application of the system. The reference count for different inductors can be different. When a page of a book is opened, the sensor plate in that page leaves the corresponding inductor and the frequency of the oscillator will decrease. Decreasing of the frequency of the frequency means the decreasing of NX. By comparing NX with NR corresponding to every inductor, which page of a book is opened can be determined.

Although specific embodiments of the invention have been disclosed, it will be understood by those having skill in the art that minor changes can be made to the form and details of the specific embodiments disclosed herein, without departing from the scope of the invention. The embodiments presented above are for purposes of example only and are not to be taken to limit the scope of the appended claims.

What is claimed is:

1. An automatic page detector, consisting:
a time base oscillator, providing the system clock to a microprocessor;
an array of sensor plates, each sensor is locating on each page of a book;
an array of LC oscillators, each LC oscillator of said array of LC oscillators consists of an amplifier, an input capacitor, an output capacitor and an inductor, said inductor is coupled to one sensor plate of said sensor plates array on each page of a book, the frequency of said LC oscillator is determined by the inductance of said inductor and the capacitance of said input capacitor and said output capacitor, the distance between said inductor and said sensor plate will affect the inductance of said inductor and the frequency of said LC oscillator, the outputs of said LC oscillators are connected to the inputs of a microprocessor;
a microprocessor, calculating and processing the frequency counts for every said LC oscillators, comparing the frequency counts with the reference counts for each LC oscillators, such that which page of a book is opened can be determined.

2. The automatic page detector as recited in claim 1, wherein said sensor plate is diamagnetic material.

3. The automatic page detector as recited in claim 2, wherein said diamagnetic material is copper.

4. The automatic page detector as recited in claim 2, wherein said diamagnetic material is aluminum.

5. The automatic page detector as recited in claim 2, wherein said diamagnetic material is lead.

6. The automatic page detector as recited in claim 2, wherein said diamagnetic material is silver.

7. The automatic page detector as recited in claim 2, wherein said diamagnetic material is carbon.

8. The automatic page detector as recited in claim 2, wherein said ferromagnetic material is iron.

9. The automatic page detector as recited in claim 2, wherein said ferromagnetic material is ferrite.

10. The automatic page detector as recited in claim 1, wherein said sensor plate is a thin plate adhered on the paper of an electronic book.

11. The automatic page detector as recited in claim 1, wherein said sensor plate is a powder printed on the paper of an electronic book.

12. An automatic page detector, consisting:
a time base oscillator, providing the system clock to a microprocessor;
a microprocessor, calculating and processing the frequency counts, comparing the frequency counts with the reference counts;
an array of sensor plates, each sensor is locating on each page of a book;
a LC oscillator, consists of an amplifier, an input capacitor, an output capacitor, an array of analog switches and an array of inductors, each of said inductors is coupled to one sensor plate of said sensor plates array on each page of a book, each of said analog switches is connected to the input of said amplifier, each of said inductors is connected from the output of said amplifier to the input of said amplifier through an analog switch, said analog switches are scanned sequentially by the outputs of said microprocessor, only one of said inductors is selected by said microprocessor at one time, selection of said inductor is through one of said analog switches, the frequency of said LC oscillator is determined by the inductance of said selected inductor and capacitance of said input capacitor and said output capacitor, the distance between said inductor and said sensor plate will affect the inductance of said inductor and the frequency of said LC oscillator, said microprocessor calculates and processes the frequency count of said LC oscillator corresponding to each selected inductors, comparing the frequency count with the reference count corresponding to every inductor, such that which page of a book is opened can be determined.

13. The automatic page detector as recited in claim 12, wherein said sensor plate is diamagnetic material.

14. The automatic page detector as recited in claim 12, wherein said sensor plate is a thin plate adhered on the paper of an electronic book.

15. An automatic page detector, consisting:
a time base oscillator, providing the system clock to a microprocessor;
a microprocessor, calculating and processing the frequency count of a LC oscillator for each selected inductor, comparing the frequency counts with the reference counts for each selected inductor;
an array of sensor plates, each sensor is locating on each page of a book;
a LC oscillator, said oscillator consists of an amplifier, an input capacitor, an output capacitor, an array of analog switches and an array of inductors, each of said inductor is coupled to one sensor plate of said sensor plate array, each of said analog switches is connected to the output of said amplifier, each of said inductor is connected from the input of said amplifier to the output of said amplifier through an analog switch, said analog switches are scanned sequentially by the outputs of said microprocessor, only one of said inductors is selected by said microprocessor at one time, selection of said inductor is through one of said analog switches, the frequency of said LC oscillator is determined by inductance of said selected inductor and, the capacitance of said input capacitor and said output capacitor, the distance between said inductor and said sensor plate will affect the inductance of said inductor and the frequency of said LC oscillator, said microprocessor calculates and processes the frequency count of said LC oscillator for each selected inductor, comparing said frequency counts with the reference counts for each selected inductor, which page of a book is opened can be determined.

16. The automatic page detector as recited in claim 15, wherein said sensor plate is diamagnetic material.

17. An automatic page detector, consisting:
a time base oscillator, providing the system clock to a microprocessor;
a microprocessor, calculating and processing the frequency counts, comparing the frequency counts with the reference counts;
an array of sensor plates, each sensor is locating on each page of a book;
a LC oscillator, consists of an amplifier, an input capacitor, an output capacitor, a column of M analog switches connected at the input of said amplifier, a row of N analog switches connected at the output of said amplifier, and a matrix of inductors with M columns and N rows, two terminals of each said inductor in matrix are connected to the input and the output of said amplifier through one of said M analog switches and one of said N analog switches respectively, said M analog switches are scanned sequentially by M column outputs of said microprocessor, said N analog switches are scanned sequentially by N row outputs of said microprocessor, the timing of said M column outputs and said N row outputs are designed such that only one inductor is selected at one time, the frequency of said LC oscillator is determined by the inductance of said inductor and the capacitance of said input and output capacitors, the distance between the selected inductor and the corresponding sensor plate can affect the inductance of selected inductor and the frequency of said LC oscillator, connecting the output of said oscillator to said microprocessor, the frequency count of said oscillator corresponding to each selected inductor can be calculated and processed by said microprocessor, comparing said frequency count with reference count for every inductor, which page of a book is opened can be determined.

18. The automatic page detector as recited in claim 17, wherein said sensor plate is diamagnetic material.

19. The automatic page detector as recited in claim 17, wherein said sensor plate is a powder printed on the paper of an electronic book.

20. The automatic page detector as recited in claim 1, 12, 15 or 17, wherein said sensor plate is ferromagnetic material.

* * * * *